United States Patent
Jung et al.

(10) Patent No.: US 7,911,722 B2
(45) Date of Patent: Mar. 22, 2011

(54) COMPOSITION FOR FORMING PRISM LAYER AND PRISM FILM MANUFACTURED USING THE SAME

(75) Inventors: Woo Chul Jung, Seoul (KR); Chang Kun Kim, Yongin-si (KR); Jong Min Park, Anyang-si (KR)

(73) Assignee: Kolon Industries, Inc., Gwacheon-si (KR)

( * ) Notice: Subject to any disclaimer, the term of this patent is extended or adjusted under 35 U.S.C. 154(b) by 0 days.

(21) Appl. No.: 11/814,851

(22) PCT Filed: Jan. 26, 2006

(86) PCT No.: PCT/KR2006/000306
§ 371 (c)(1),
(2), (4) Date: Apr. 9, 2008

(87) PCT Pub. No.: WO2006/080813
PCT Pub. Date: Aug. 3, 2006

(65) Prior Publication Data
US 2008/0312355 A1    Dec. 18, 2008

(30) Foreign Application Priority Data
Jan. 27, 2005   (KR) .................. 10-2005-0007552

(51) Int. Cl.
*C08J 7/04*      (2006.01)
*C08F 220/00*    (2006.01)
*G02B 5/04*      (2006.01)

(52) U.S. Cl. ........ 359/834; 359/831; 522/173; 522/182; 522/183; 526/284; 526/320; 526/328

(58) Field of Classification Search .................. 522/181, 522/183, 107, 173, 182; 359/586, 831, 834; 526/284, 291, 292.1, 292.3, 319, 320, 328
See application file for complete search history.

(56) References Cited

U.S. PATENT DOCUMENTS

| | | | |
|---|---|---|---|
| 5,502,139 A * | 3/1996 | Toh et al. ........................ | 526/284 |
| 5,903,391 A | 5/1999 | Toshima et al. | |
| 5,977,276 A * | 11/1999 | Toh et al. ........................ | 526/308 |
| 6,319,603 B1 * | 11/2001 | Komiya et al. ................. | 428/378 |
| 6,770,421 B2 * | 8/2004 | Takeuchi et al. ........... | 430/280.1 |
| 6,777,070 B1 * | 8/2004 | Murata et al. .................. | 428/323 |
| 7,214,431 B2 * | 5/2007 | Komiya et al. ............ | 428/411.1 |
| 7,446,159 B1 * | 11/2008 | Samukawa et al. ........... | 526/284 |
| 7,599,133 B2 * | 10/2009 | Nakai et al. .................... | 359/796 |
| 7,751,678 B2 * | 7/2010 | Shibata et al. ................. | 385/141 |
| 2005/0058911 A1 * | 3/2005 | Takeyama ........................ | 430/1 |
| 2005/0100722 A1 * | 5/2005 | Kitamura et al. .............. | 428/212 |

FOREIGN PATENT DOCUMENTS

| | | | |
|---|---|---|---|
| JP | 05093069 A1 | | 4/1993 |
| JP | 05323319 A1 | | 12/1993 |
| JP | 14275285 A | | 9/2002 |
| JP | 2002275285 | * | 9/2002 |
| JP | 16244606 A | | 9/2004 |
| JP | 2004244606 | * | 9/2004 |

\* cited by examiner

*Primary Examiner* — Susan W Berman
(74) *Attorney, Agent, or Firm* — Sughrue Mion, PLLC

(57) ABSTRACT

A composition for forming a prism layer and a prism film manufactured using the same. The composition for forming a prism layer includes a UV-curable monomer A, including a fluorene derivative diacrylate monomer represented by Formula 1 or 2; a UV-curable monomer B, including at least one acrylate monomer; a photoinitiator; and an additive, and thus is excellent in surface strength, adhesion to a substrate film and anti-yellowing properties, with a viscosity suitable for formation of the prism layer.

11 Claims, No Drawings

COMPOSITION FOR FORMING PRISM LAYER AND PRISM FILM MANUFACTURED USING THE SAME

This is a national stage application under 35 U.S.C. §371 of PCT/KR2006/000306 filed on Jan. 26, 2006, which claims priority from Korean patent application 10-2005-0007552 filed on Jan. 27, 2005, all of which are incorporated herein by reference.

TECHNICAL FIELD

The present invention relates, generally, to a composition for forming a prism layer and a prism film manufactured using the same. More particularly, the present invention relates to a composition for formation of a prism layer having excellent surface strength, adhesion to a substrate film and anti-yellowing properties, with a viscosity suitable for formation of the prism layer, and to a prism film manufactured using such a composition.

BACKGROUND ART

In general, a prism film is used to increase luminance of a backlight unit disposed at the rear surface of a liquid crystal display (LCD). Various attempts have been made to date to increase luminance of the backlight unit. High luminance of the backlight unit may be realized by appropriately controlling the light flow of the backlight unit. As such, the light flow may be controlled using a three-dimensional structure capable of suitably employing theories of interference, diffraction and polarization and photon theory, interpreted by the wave nature and particle nature of light. Further, by changing the physical properties of the material constituting such a three-dimensional structure, the light flow can be additionally controlled. Thereby, photons may be emitted toward a user's desired direction, and thus luminance may be increased in such a direction. A film manufactured to have a specific three-dimensional structure for increasing frontal luminance of a light source device is disclosed in U.S. Pat. Nos. 4,542,449 and 4,906,070 and Korean Patent Application No. 1986-0009868.

The film has a prism layer composed of a corrugated surface on one side and a smooth surface on the other side, in which the corrugated surface includes a plurality of uniform isosceles triangles linearly arrayed at about 45° relative to the smooth surface. Further, two films having such prism layers are aligned orthogonally to provide a luminance increase film (hereinafter, referred to as 'prism film').

As the important optical factor of the material constituting the prism layer of the prism film, there is a refractive index. As the refractive index is increased, performance of the prism film is improved. The prism film having a high refractive index is used to increase the efficiency of the backlight unit of the LCD, which is disclosed in Japanese Patent Laid-open Publication No. Hei. 5-127159. Additionally, the arrangement process is disclosed in Japanese Patent Laid-open Publication No. Hei. 5-323319.

The prism layer of the prism film is formed of a polymer resin polymerizable by a free radical, in particular a UV-curable resin. Typically, a UV-curable polymer having a high refractive index is exemplified by (meth)acrylate having at least one aromatic moiety, (meth)acrylate containing halogen except fluorine, or sulfur-containing (meth)acrylate. The polymer resins having high refractive indexes are appropriately mixed to manufacture a prism film, which is then applied to the backlight unit.

However, when the compound having an aromatic moiety, serving as the high-refraction resin, is exposed to UV light for a long period of time, a yellowing phenomenon may occur. That is, in the backlight unit, a cold cathode fluorescent lamp (CCFL) serving as a light source partially emits UV light. Thus, as the number of CCFLs is increased and an exposure time to the CCFL is lengthened, the amount of UV light accumulated in the high-refraction polymer resin is drastically increased, and therefore a chromophore may be produced by the aromatic moiety, undesirably generating yellowing. Such yellowing malfunctions to decrease performance of the prism film. Hence, the high-refraction composition for use in forming the prism layer of the prism film should have means for preventing yellowing due to UV light.

In addition to stability to UV light, the high-refraction composition for use in forming the prism layer of the prism film should have conditions capable of increasing surface strength while maintaining adhesion required to securely support the high-refraction polymer resin to the transparent substrate film. Moreover, if the viscosity of the high-refraction composition is high, such a composition is difficult to process. Accordingly, it is preferred that the composition be maintained in a liquid state at room temperature.

Presently, the development of a high-refraction composition satisfying all of the above requirements is urgently required.

DISCLOSURE OF THE INVENTION

Therefore, it is an object of the present invention to provide a composition for forming a prism layer of a prism film that is increased in surface strength and adhesion to a substrate film after formation of the prism film and has a viscosity suitable for forming the prism layer of the prism film, with prevention of yellowing by UV light.

It is another object of the present invention to provide a prism film manufactured using the composition.

In order to achieve the above objects, the present invention provides a composition for forming a prism layer of a prism film, which comprises a UV-curable monomer A, including a fluorene derivative diacrylate monomer represented by Formula 1 or 2 below; a UV-curable monomer B, including at least one acrylate monomer; a photoinitiator; and an additive:

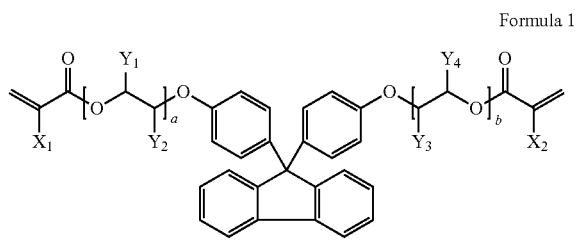

Formula 1 wherein $X_1$ and $X_2$ are each H or $CH_3$, $Y_1$ to $Y_4$ are each H, $CH_3$ or OH, and a and b are each an integer from 0 to 4; and

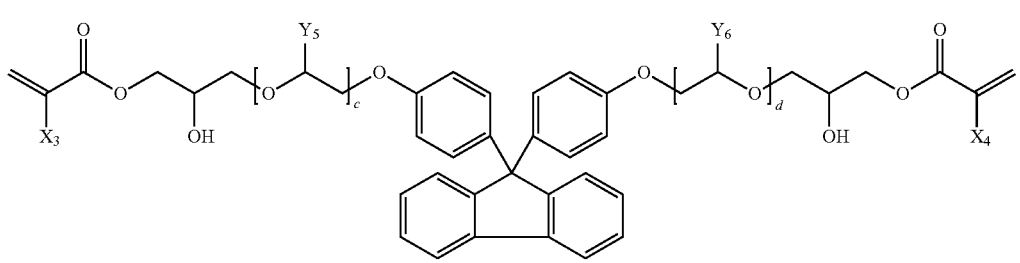

Formula 2 wherein $X_3$ and $X_4$ are each H or $CH_3$, $Y_5$ and $Y_6$ are each H or $CH_3$, and c and d are each an integer from 0 to 4.

The UV-curable monomer B may be a polyfunctional acrylate monomer having an isocyanurate ring, or at least one monomer selected from the group consisting of tetrahydrofurfurylacrylate, 2(2-ethoxyethoxy)ethylacrylate, and 1,6-hexanedioldiacrylate.

In addition, the UV-curable monomer B may comprise the polyfunctional acrylate monomer having an isocyanurate ring and the at least one monomer selected from the group consisting of tetrahydrofurfurylacrylate, 2(2-ethoxyethoxy)ethylacrylate, and 1,6-hexanedioldiacrylate.

The polyfunctional acrylate monomer having an isocyanurate ring may be tris(hydroxyalkyl)isocyanurate triacrylate monomer.

The UV-curable monomer B may be used in an amount of 1 to 80 parts by weight, based on 100 parts by weight of the UV-curable monomer A.

The composition may further comprise a UV-curable monomer C including an acrylic monomer having a refractive index of 1.50 or more and a viscosity at 25° C. of 2000 cps or less.

The UV-curable monomer C may be at least one monomer selected from the group consisting of benzyl(meth)acrylate, phenoxyethyl(meth)acrylate, phenoxypolyethyleneglycol(meth)acrylate, 2-hydroxy-3-phenoxypropylacrylate, neopentylglycolbenzoateacrylate, 2-hydroxy-3-phenoxypropylacrylate, and phenylphenoxyethanolacrylate.

The UV-curable monomer C may be used in an amount of 5 to 100 parts by weight, based on 100 parts by weight of the UV-curable monomer A.

The additive may be a UV absorbent and/or a hindered amine light stabilizer.

In addition, the present invention provides a prism film comprising a transparent substrate film; and a prism layer formed on one surface of the transparent substrate film using the above composition.

The prism film may further comprise a low-refraction layer having a refractive index lower than the transparent substrate film and formed on the other surface of the transparent substrate film.

The low-refraction layer may comprise organic or inorganic particles.

BEST MODE FOR CARRYING OUT THE INVENTION

Hereinafter, a detailed description will be given of the present invention.

In the present invention, a composition for use in formation of a prism layer of a prism film includes different kinds of UV-curable monomers, a photoinitiator, and an additive.

Of the UV-curable monomers, a UV-curable monomer A is a fluorene derivative diacrylate monomer represented by Formula 1 or 2 below:

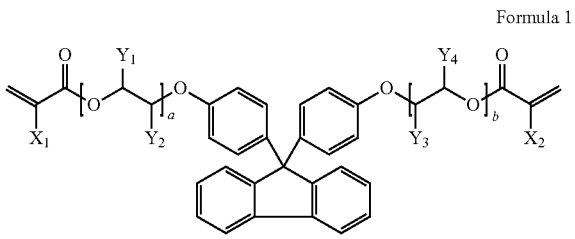

Formula 1 wherein $X_1$ and $X_2$ are each H or $CH_3$, $Y_1$ to $Y_4$ are each H, $CH_3$ or OH, and a and b are each an integer from 0 to 4; and

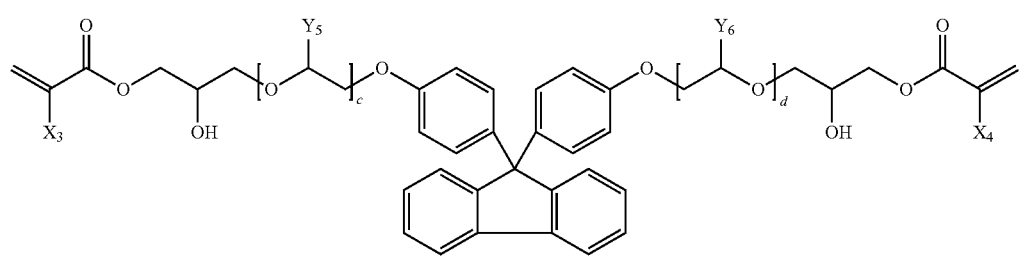

Formula 2 wherein $X_3$ and $X_4$ are each H or $CH_3$, $Y_5$ and $Y_6$ are each H or $CH_3$, and c and d are each an integer from 0 to 4.

The fluorene derivative diacrylate monomer represented by Formula 1 or 2 has a high refractive index of 1.55~1.65, and thus a high refractive index of the cured prism layer is maintained. In addition, since this monomer has excellent heat resistance and light resistance, it may be preferably used as the material for formation of the prism layer of the prism film.

In order to increase surface strength and adhesion to a substrate film after curing of the fluorene derivative diacrylate monomer, a UV-curable monomer B may be used, including a polyfunctional acrylate monomer having an isocyanurate ring or at least one monomer selected from the group consisting of tetrahydrofurfurylacrylate, 2(2-ethoxyethoxy)ethylacrylate, and 1,6-hexanedioldiacrylate.

In addition, as the UV-curable monomer B, a mixture of polyfunctional acrylate monomer having an isocyanurate ring and at least one monomer selected from the group consisting of tetahydrofurfurylacrylate, 2(2-ethoxyethoxy)ethylacrylate, and 1,6-hexanedioldiacrylate may be used.

As such, the polyfunctional acrylate monomer having an isocyanurate ring is tris(2-hydroxyethyl)isocyanurate triacrylate.

Since the polyfunctional acrylate monomer having an isocyanurate ring has a polyfunctional group, it functions as a crosslinking agent upon UV-curing of the composition of the present invention to increase a glass transition temperature, accordingly increasing the strength after curing of the composition. Further, the monomer having an isocyanurate ring has a chemical structure in which nonlocalized electrons are uniformly disposed, thus assuring physical adhesion depending on an electron density gradient. Thereby, after curing of the composition of the present invention, adhesion to the substrate film may be improved.

In addition, at least one monomer selected from among tetrahydrofurfurylacrylate, 2(2-ethoxyethoxy)ethylacrylate and 1,6-hexanedioldiacrylate functions to further increase adhesion to the substrate film after curing of the composition of the present invention, thanks to its infiltration capacity to fine gaps of the substrate film upon curing of the composition.

The UV-curable monomer B is preferably used in an amount of 1 to 80 parts by weight, based on 100 parts by weight of the UV-curable monomer A.

As the UV-curable monomer B, in the case of using the mixture comprising polyfunctional acrylate having an isocyanurate ring and at least one selected from among tetrahydrofurfurylacrylate, 2(2-ethoxyethoxy)ethylacrylate and 1,6-hexanedioldiacrylate, the polyfunctional acrylate having an isocyanurate ring and at least one selected from among tetrahydrofurfurylacrylate, 2(2-ethoxyethoxy)ethylacrylate and 1,6-hexanedioldiacrylate are preferably mixed at a weight ratio of 5~40:1~5.

With the goal of maintaining the viscosity of the composition of the present invention to be suitable for processing thereof, the composition of the present invention further includes a UV-curable monomer C, which is a monomer being highly dissolvable in the fluorene derivative diacrylate monomer serving as the UV-curable monomer A and having a sufficiently low viscosity to the extent that the viscosity of the composition is decreased after dissolution. Such a UV-curable monomer C includes an acrylic monomer having a refractive index of 1.50 or more and a viscosity at 25° C. of 2000 cps or less, which is preferably exemplified by at least one selected from the group consisting of benzyl(meth)acrylate, phenoxyethyl(meth)acrylate, phenoxypolyethyleneglycol (meth)acrylate, 2-hydroxy-3-phenoxypropylacrylate, neopentylglycolbenzoateacrylate, 2-hydroxy-3-phenoxypropyl acrylate and phenylphenoxyethanolacrylate.

The UV-curable monomer C is preferably used in an amount of 5 to 100 parts by weight, based on 100 parts by weight of the fluorene derivative diacrylate monomer serving as the UV-curable monomer A.

In addition, the composition of the present invention further includes a photoinitiator for use in initiating photopolymerization of the UV-curable monomers, which is exemplified by at least one selected from the group consisting of phosphine oxides, propanones, ketones, and formates and is preferably used in an amount of 0.1 to 5 parts by weight, based on 100 parts by weight of the composition.

In addition, the composition for formation of a prism layer of the present invention may further include an additive, if necessary.

As a representative additive in the present invention, a UV absorbent is used, thus preventing yellowing caused by UV light upon use of the prism film for a long period of time.

The UV absorbent usable in the present invention may be selected depending on the wavelength of UV light occurring from a light source, and is typically exemplified by at least one selected from the group consisting of oxalic analide, benzophenone, benzotriazine and bensotriazole. Such an absorbent is preferably used in an amount of 0.1 to 5 parts by weight, based on 100 parts by weight of the composition of the present invention.

Also, as the additive, a hindered amine light stabilizer may be used in an amount of 0.1 to 5 parts by weight, based on 100 parts by weight of the composition of the present invention, thus further increasing the performance of the UV absorbent.

In addition, an antistatic agent may be further included.

Below, a description will be given of a prism film using the composition for formation of a prism layer of the present invention.

The prism film of the present invention includes a transparent substrate film, and a prism layer formed on one surface of the transparent substrate film using the composition for formation of a prism layer mentioned above.

The composition of the present invention is applied onto a frame engraved with a three-dimensional structure (prism structure) having a luminance increase function, and one surface of the transparent substrate film comes into contact with the coating surface of the frame. Then, UV light is radiated onto the transparent substrate film to light-cure the composition applied onto the frame, and the coating layer, which is cured in a state of adhering to the transparent substrate film, is separated from the frame, thereby forming a prism layer on the one surface of the transparent substrate film.

Further, on the other surface of the transparent substrate film, a low-refraction layer having a refractive index lower than the transparent substrate film may be formed. The low-refraction layer may be composed of organic or inorganic particles.

Typical examples of the organic particles include acrylic particles, such as methylmethacrylate, acrylic acid, methacrylic acid, hydroxyethylmethacrylate, hydroxypropylmethacrylate, acrylamide, methylolacrylamide, glycidylmethacrylate, ethylacrylate, isobutylacrylate, n-butylacrylate, 2-ethylhexylacrylate polymers; olefin particles, such as polyethylene, polystyrene, polypropylene, etc.; acryl-olefin copolymer particles; and multi-layer multicomponent particles obtained by forming a layer of homopolymer particles and then applying another monomer layer onto the layer of homopolymer particles.

Examples of the inorganic particles include silicon oxide, aluminum oxide, titanium oxide, zirconium oxide, magnesium fluoride, etc. The above-mentioned organic particles and inorganic particles are merely illustrative, and are not limited to the above-listed organic or inorganic particles, and other known materials may be used as long as they may achieve the main purpose of the present invention, which is apparent to those skilled in the art, and also such modifications of materials are understood within the range of the technical scopes of the present invention.

A better understanding of the present invention may be obtained in light of the following examples which are set forth to illustrate, but are not to be construed to limit the present invention.

Examples 1~6

Components and component ratios of compositions of Examples 1~6 are shown in Table 1 below.

As shown in the components and component ratios of Table 1, the composition for formation of a prism layer of the present invention was applied onto a frame engraved with a three-dimensional structure (prism layer) having a luminance increase function according to a typical process, and one surface of a transparent substrate film (PET film) having a refractive index of 1.58 to 1.64 came into contact with the coating surface of the frame. Then, UV light was radiated onto the transparent substrate film to light-cure the composition applied onto the frame, and the coating layer that was cured in a state of adhering to the transparent substrate film was separated from the frame, thereby manufacturing a prism film having the transparent substrate film and the prism layer formed on one surface of such a substrate film.

As such, as a UV system, an electrodeless UV lamp (600 W/inch), available from Fusion, USA, equipped with a type-D bulb was used, by which 900 mJ/cm$^2$ was radiated.

The properties of the compositions and prism films of the examples were measured as follows.

(1) Refractive Index of Composition

In order to measure the refractive index of the composition, a refractometer (1T, ATAGO ABBE, Japan) was used. As such, as a light source for measurement, a D-light sodium lamp of 589.3 nm was used.

(2) Refractive Index of Cured Composition

In order to measure the refractive index of the cured composition, the composition was applied onto the PET film, covered with a smooth metal plate and then compressed to a thickness of 20 μm. Subsequently, using an electrodeless UV lamp (600 W/inch), available from Fusion, USA, equipped with a type-D bulb, energy of 700 mJ/cm$^2$ was radiated onto the PET film, followed by removing the metal plate. The refractive index of the PET film having the cured composition was measured using a refractrometer (1T, ATAGO ABBE, Japan). As a light source for measurement, a D-light sodium lamp of 589.3 nm was used.

(3) Viscosity

The viscosity of the coating solution was measured at 25° C. using a viscometer (BROOKFIELD Viscometer, HBDV-II+).

(4) Luminance (Cd/m$^2$)

The prism film manufactured above was mounted to a backlight unit for a 17-inch LCD panel (LM170E01, Heesung Electronics, Korea), and luminance of 13 points was measured using a luminance meter (BM-7, TOPCON, Japan) and then averaged.

TABLE 1

| | Component | Ex. 1 | Ex. 2 | Ex. 3 | Ex. 4 | Ex. 5 | Ex. 6 |
|---|---|---|---|---|---|---|---|
| | | | | | Unit: Parts by Weight | | |
| UV-curable Monomer | [A]9,9-Bis[4-(2-acryloyloxyethoxy)phenyl]fluorene | 100 | 100 | 100 | 100 | 100 | 100 |
| | [B]Tris(2-hydroxyethyl)isocyanurate triacrylate | 20 | 21 | 14.5 | 10.5 | 32 | 21 |
| | [B]1,6-Hexanedioldiacrylate | 60 | 55 | 50 | 2.9 | 3.5 | 2.7 |
| | [C]Phenoxyethylacrylate | — | — | — | 82 | 100 | 60.7 |
| Photoinitiator | 2,4,6-Trimethylbenzoyl diphenylphosphine oxide | 6 | 6 | 5.5 | 6.2 | 7.5 | 5.9 |
| UV Absorbent | 2(2'Hydroxy-5-t-octoxybenzotriazole) | 3.6 | — | 2.9 | 3.7 | 3.75 | 3.0 |
| | Bis(1,2,2,6,6-pentamethyl-4-piperidyl)sebacate | 3 | 2.7 | 2.2 | 2.9 | 3.5 | 2.7 |

Examples 7~12

Using the composition for formation of a prism layer of component and component ratio of each of Examples 1~6, a prism layer was formed on one surface of a transparent substrate film as in Examples 1~6. In addition, a UV-curable coating solution formed mainly of an acrylate monomer having a refractive index of 1.48~1.50 was prepared, applied onto the other surface of the transparent substrate film and then underwent a UV-curing process to form a low-refraction layer.

Examples 13~16

Using the composition for formation of a prism layer of component and component ratio of each of Examples 1, 2, 5 and 6, a prism layer was formed on one surface of a transparent substrate film as in Examples 1~6. In addition, a UV-curable coating solution, formed mainly of an acrylate monomer having a refractive index of 1.48~1.50 and including methyl methacrylate particles, was prepared, applied onto the other surface of the transparent substrate film and then underwent a UV-curing process to form a low-refraction layer.

(5) Measurement of Initial Color Coordinate

The color coordinate values of 13 points for measurement of luminance in (4) were averaged. The color coordinate system is represented by international standard CIE La★b★, and the value of b★ is represented.

(6) Measurement of UV Yellowing 6-1) Luminance (Cd/m$^2$)

The prism film was allowed to stand at 80° C. and 0.34 W/m$^2$ in a weatherometer for 200 hours, and luminance was then measured in the same manner as in (4).

6-2) Yellowing

The prism film was allowed to stand at 80° C. and 0.34 W/m$^2$ in a weatherometer for 200 hours, and the color coordinates were measured in the same manner as in (5). The color coordinate system is represented by international standard CIE La★b★, and the value of b★ is represented.

(7) Adhesion (Detached Number/100)

The composition was applied onto a transparent PET substrate film, covered with a smooth metal plate, compressed to a thickness of 3 μm, and then cured, after which the metal plate was removed. The cured composition layer was cut into 100 matrix structures in a region of 10×10 mm$^2$, after which tape was attached to the cut matrix structures and then detached perpendicular to the attachment surface under strong force, whereby the number of detached matrixes was counted.

(8) Flexibility

The composition was applied onto a transparent PET substrate film, covered with a smooth metal plate, compressed to a thickness of 3 μm, and then cured, after which the metal plate was removed. When the cured composition layer as a coating film was folded in two to face outwards, the adhesion state between the transparent PET substrate film and the applied composition layer was observed with the naked eye.

(coating film was maintained←⊚>○>Δ>X→coating film was detached)

The results of assaying the properties of the composition and prism film in the examples are given in Table 2 below.

TABLE 2

|  | Refract. Index of Composi. | Refract. Index of Film | Viscos. (cps) | Luminan. (Cd/m²) | Color Coordi. (b*) | UV Yellowing Luminan. (Cd/m²) | UV Yellowing Color Coordi. (b*) | Adhes. | Flexibil. |
|---|---|---|---|---|---|---|---|---|---|
| Ex. 1 | 1.5721 | 1.5990 | 1614 | 2912 | 7.2 | 2870 | 9.5 | 0/100 | ⊚ |
| Ex. 2 | 1.5725 | 1.5990 | 1638 | 2912 | 7.5 | 2861 | 45 | 0/100 | ○ |
| Ex. 3 | 1.5774 | 1.5903 | 1732 | 2907 | 7.7 | 2800 | 15.3 | 3/100 | ⊚ |
| Ex. 4 | 1.5700 | 1.5886 | 1492 | 2900 | 7.5 | 2784 | 11.4 | 5/100 | ⊚ |
| Ex. 5 | 1.5604 | 1.5869 | 1329 | 2890 | 6.8 | 2825 | 8.5 | 0/100 | ○ |
| Ex. 6 | 1.5727 | 1.6000 | 1639 | 2925 | 7.3 | 2833 | 15 | 0/100 | ○ |
| Ex. 7 | 1.5721 | 1.5990 | 1614 | 2923 | 7.2 | 2872 | 9.3 | 0/100 | ⊚ |
| Ex. 8 | 1.5725 | 1.5990 | 1638 | 2922 | 7.5 | 2860 | 46 | 0/100 | ○ |
| Ex. 9 | 1.5774 | 1.5903 | 1732 | 2918 | 7.7 | 2803 | 15 | 3/100 | ⊚ |
| Ex. 10 | 1.5700 | 1.5886 | 1492 | 2909 | 7.5 | 2781 | 11.5 | 4/100 | ⊚ |
| Ex. 11 | 1.5604 | 1.5869 | 1329 | 2899 | 6.8 | 2823 | 8.1 | 0/100 | ○ |
| Ex. 12 | 1.5727 | 1.6000 | 1639 | 2935 | 7.3 | 2830 | 15.5 | 0/100 | ○ |
| Ex. 13 | 1.5721 | 1.5721 | 1614 | 2919 | 7.2 | 2877 | 9.5 | 0/100 | ⊚ |
| Ex. 14 | 1.5725 | 1.5725 | 1638 | 2920 | 7.5 | 2855 | 40 | 0/100 | ○ |
| Ex. 15 | 1.5604 | 1.5604 | 1329 | 2895 | 6.8 | 2820 | 8.2 | 0/100 | ○ |
| Ex. 16 | 1.5727 | 1.5727 | 1639 | 2930 | 7.3 | 2825 | 18 | 0/100 | ○ |

As is apparent from Table 2, the prism layer of the prism film of each of Examples 1~6 had a high refractive index and a viscosity suitable for process workability, and also was excellent in adhesion to the substrate film and flexibility after curing thereof.

Further, in Examples 7~12, each having the low-refraction layer formed on the other surface of the transparent substrate layer, luminance was increased by about 0.5% over Examples 1~6, having no low-refraction layer. Even though the low-refraction layer was formed on the other surface of the transparent substrate layer, the film was confirmed to have constant flexibility.

Furthermore, in Examples 13~16, each having the low-refraction layer further including organic or inorganic particles formed on the other surface of the transparent substrate layer, luminance was slightly decreased compared to Examples 7~12, each having the low-refraction layer formed on the other surface of the transparent substrate layer without organic or inorganic particles, but the degree of decrease in luminance was regarded as negligible. Thus, there was no difference in luminance.

INDUSTRIAL APPLICABILITY

As previously described herein, the present invention provides a composition for forming a prism layer and a prism film manufactured using the same. According to the present invention, the composition for formation of the prism layer has a high refractive index, a viscosity suitable for formation of a prism layer of a prism film, and high adhesion to a substrate film after formation of a prism film, with preventing yellowing caused by UV light.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A composition for forming a prism layer of a prism film, comprising:
   a ultraviolet (UV)-curable monomer A, including a fluorene derivative diacrylate monomer represented by Formula 1 or 2 below;
   a UV-curable monomer B comprising a polyfunctional acrylate monomer having an isocyanurate ring;
   a photoinitiator; and
   an additive:

Formula 1

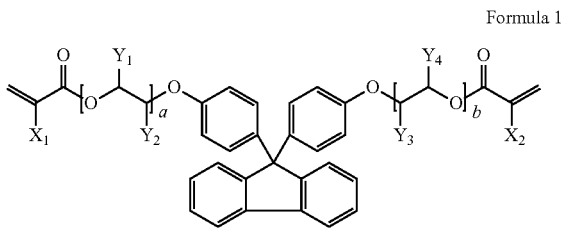

wherein $X_1$ and $X_2$ are each H or $CH_3$, $Y_1$ to $Y_4$ are each H, $CH_3$ or OH, and a and b are each an integer from 0 to 4; and Formula 2

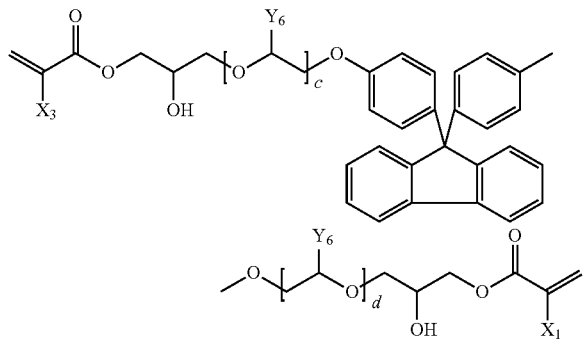

wherein $X_3$ and $X_4$ are each H or $CH_3$, $Y_5$ and $Y_6$ are each H or $CH_3$, and c and d are each an integer from 0 to 4.

2. The composition according to claim 1 wherein the UV-curable monomer B further comprises at least one monomer selected from the group consisting of tetrahydrofurfurylacrylate, 2(2-ethoxyethoxy)ethylacrylate, and 1,6-hexanedioldiacrylate.

3. The composition according to claim 1 wherein the polyfunctional acrylate monomer having an isocyanurate ring is tris(hydroxyalkyl)isocyanurate triacrylate monomer.

4. The composition according to claim 1, wherein the UV-curable monomer B is used in an amount of 1 to 80 parts by weight, based on 100 parts by weight of the UV-curable monomer A.

5. The composition according to claim 1, further comprising a UV-curable monomer C including an acrylic monomer having a refractive index of 1.50 or more and a viscosity at 25° C. of 2000 cps or less.

6. The composition according to claim 5, wherein the UV-curable monomer C is at least one monomer selected from the group consisting of benzyl(meth)acrylate, phenoxyethyl (meth)acrylate, phenoxypolyethyleneglycol (meth)acrylate, 2-hydroxy-3-phenoxypropylacrylate, neopentylglycolbenzoateacrylate, and phenylphenoxyethanolacrylate.

7. The composition according to claim 5, wherein the UV-curable monomer C is used in an amount of 5 to 100 parts by weight, based on 100 parts by weight of the UV-curable monomer A.

8. The composition according to claim 1, wherein the additive is a UV absorbent and/or a hindered amine light stabilizer.

9. A prism film, comprising:
a transparent substrate film; and
a prism layer formed by applying the composition of any one of claims 1 or 2 to 8 to one side of the transparent substrate film and curing.

10. The prism film according to claim 9, further comprising a low-refraction layer having a refractive index lower than the transparent substrate film and formed on the other surface of the transparent substrate film.

11. The prism film according to claim 10, wherein the low-refraction layer comprises organic or inorganic particles.

* * * * *